(12) United States Patent
Schoen

(10) Patent No.: US 9,296,644 B2
(45) Date of Patent: Mar. 29, 2016

(54) HIGH-TEMPERATURE GLASS SOLDER AND ITS USES

(75) Inventor: Bastian Schoen, Landshut (DE)

(73) Assignee: SCHOTT AG, Mainz (DE)

( * ) Notice: Subject to any disclaimer, the term of this patent is extended or adjusted under 35 U.S.C. 154(b) by 935 days.

(21) Appl. No.: 13/024,432

(22) Filed: Feb. 10, 2011

(65) Prior Publication Data

US 2011/0198029 A1  Aug. 18, 2011

(30) Foreign Application Priority Data

Feb. 15, 2010  (EP) .................................... 10001512
Aug. 24, 2010  (DE) .......................... 10 2010 035 251

(51) Int. Cl.
*C03C 8/24* (2006.01)
*C03C 3/064* (2006.01)

(52) U.S. Cl.
CPC .. *C03C 8/24* (2013.01); *C03C 3/064* (2013.01)

(58) Field of Classification Search
CPC ............ C03C 8/24; C03C 8/245; C03C 3/062
USPC ......... 501/14, 15, 17, 20, 21, 73, 77; 65/33.5, 65/33.6, 36, 60.1
See application file for complete search history.

(56) References Cited

U.S. PATENT DOCUMENTS

| | | | |
|---|---|---|---|
| 5,998,037 A * | 12/1999 | Sridharan et al. ............. | 428/472 |
| 6,362,119 B1 | 3/2002 | Chiba | |
| 6,379,805 B1 * | 4/2002 | Oobuchi et al. ............... | 428/446 |
| 6,430,966 B1 | 8/2002 | Meinhardt et al. | |
| 6,532,769 B1 | 3/2003 | Meinhardt et al. | |
| 7,521,387 B2 * | 4/2009 | Xue et al. ........................ | 501/15 |
| 9,133,053 B2 | 9/2015 | Goedeke et al. | |
| 2006/0019813 A1 | 1/2006 | Yoshi | |
| 2009/0318278 A1 | 12/2009 | Mayumi et al. | |

FOREIGN PATENT DOCUMENTS

| | | | |
|---|---|---|---|
| CN | 86101451 | 10/1987 | |
| DE | 292901 | 7/1916 | |
| DE | 198 57 057 | 4/2000 | |
| DE | 101 22 327 | 11/2002 | |
| DE | 10 2005 002 435 | 7/2006 | |
| EP | 0132810 | 2/1985 | |
| JP | 60-36350 | 2/1985 | |
| JP | 3-131546 | 6/1991 | |
| JP | 4-82294 | 3/1992 | |
| JP | 6-191885 | 7/1994 | |
| JP | 7-302678 | 11/1995 | |
| JP | 2006-56769 | 3/2006 | |
| JP | 2006-73716 | 3/2006 | |
| JP | 2008-513346 | 5/2008 | |
| JP | 2012-519149 | 8/2012 | |
| SU | 1418301 A * | 8/1988 | ............. C03C 3/064 |

OTHER PUBLICATIONS

Glass Technology Edited by Northwest University of Light Industry, China Light Industry Press, Jan. 31, 1982, pp. 79-82 (With English Abstract).

"Materials and Preparation of Solid Oxide Fuel Cell" Minfang Han & Suping Peng, Science Press, Feb. 29, 2004 (With English Abstract). Metalic Interconnect Materials Used in Solid . . . by Wang Zhongli et al, Research and Development of World Science and Technology, vol. 29, No. 1, Feb. 28, 2007, pp. 30-37, (with Eng. abst.).

* cited by examiner

*Primary Examiner* — Noah Wiese
(74) *Attorney, Agent, or Firm* — Michael J. Striker

(57) ABSTRACT

The amorphous and/or partially crystalline glass solders are particularly suitable for high-temperature applications, e.g. in fuel cells or sensors in the exhaust gas stream of internal combustion engines. The glass solder is characterized by a linear coefficient of thermal expansion in the temperature range from 20° C. to 300° C. of $8.0 \times 10^{-6}$ $K^{-1}$ to $11.0 \times 10^{-6}$ $K^{-1}$ and a hemisphere temperature of 820° C. to 1100° C. and is suitable for laser bonding.

9 Claims, No Drawings

US 9,296,644 B2

HIGH-TEMPERATURE GLASS SOLDER AND ITS USES

CROSS-REFERENCE

The invention described and claimed herein below is also described in European Patent Application 10001512.2 filed on Feb. 15, 2010 and German Patent Application DE 10 2010 035 251.9 filed on Aug. 24, 2010. The aforesaid foreign Patent Applications, whose subject matter is incorporated herein by reference thereto, provide the basis for a claim of priority of invention under 35 U.S.C. 119.

BACKGROUND OF THE INVENTION

1. The Field of the Invention

The present invention relates to glass solders, in particular amorphous and partially crystalline glass solders, which are particularly suitable for high-temperature applications and their uses.

2. The Description of the Related Art

Glass solders are usually used for producing joints, especially to join glass and/or ceramic components to one another or to components made of metal in an electrically insulating manner. In the development of glass solders, the composition thereof is often selected so that the coefficient of thermal expansion of the glass solder corresponds approximately to that of the components to be joined to one another in order to obtain a joint which is stable in the long term. Compared to other joints, for example those composed of plastic, those based on glass solders have the advantage that they can produce a hermetic seal and can withstand relatively high temperatures.

Glass solders are often generally produced from a glass powder which is melted during the soldering operation and together with the components to be joined forms the joint when it is heated. The soldering temperature is generally selected so as to correspond approximately to the hemisphere temperature of the glass or can deviate from the latter usually by ±20 K. The hemisphere temperature can be determined by a microscopic method using a hot stage microscope. It characterizes the temperature at which an originally cylindrical test sample has melted together to form a hemispherical mass. The hemisphere temperature can be assigned a viscosity of about log η=4.6, as can be seen from the relevant technical literature. If a crystallization-free glass in the form of a glass powder is melted and cooled again so that it solidifies, it can usually be remelted at the same melting point. In the case of a joint comprising a crystallization-free glass solder, this means that the operating temperature to which the joint can be subjected in the long term must be no higher than the soldering temperature. In actual fact, the operating temperature in many applications has to be significantly below the soldering temperature, since the viscosity of the glass solder decreases with increasing temperatures and a glass having a certain flowability can be expressed from the joint at high temperatures and/or pressures, so that the joint can fail. For this reason, glass solders for high-temperature applications usually have to have a soldering temperature or hemisphere temperature which is significantly above the future operating temperature.

One field of use for such glass solders is, for example, joints in high-temperature fuel cells which can be used as an energy source in motor vehicles or for decentralized energy supply. An important type of fuel cell is, for example, the SOFC (solid oxide fuel cell), which can have very high operating temperatures of up to about 1100° C. The joint comprising the glass solder is usually used for producing fuel cell stacks, i.e. for joining a plurality of individual fuel cells to form a stack. Such fuel cells are already known and are continually being improved. In particular, the trend in present-day fuel cell development is generally in the direction of lower operating temperatures. Some fuel cells are now able to achieve operating temperatures below 800° C., so that a lowering of the soldering temperatures is possible and also desirable because of the resulting low thermal stress on the SOFC components during the soldering process.

An important role in fuel cell development is played by glass solders which have been the subject matter of the following disclosures.

DE 19857057 C1 describes an alkali-free glass-ceramic solder having a coefficient of thermal expansion $\alpha_{(20\text{-}950)}$ of $10.0 \times 10^{-6}$ K$^{-1}$ to $12.4 \times 10^{-6}$ K$^{-1}$. The solder described there contains from 20 to 50 mol % of MgO. Glasses having a high MgO content are in practice highly susceptible to crystallization, which leads to compounds which crystallize rapidly and to a high degree. In the case of such rapid and substantial crystallization, it is difficult to ensure good wetting of the material to be joined by the glass solder. However, this is necessary to be able to provide a joint which optimally satisfies the respective requirements. In addition, the glass solder described in this document contains from 40 to 50 mol % of $SiO_2$. However, an increasing content of $SiO_2$ leads to an increase in the melting point and thus also the soldering temperature.

Likewise glass-ceramic solders are described in U.S. Pat. No. 6,532,769 B1 and U.S. Pat. No. 6,430,966 B1. These solders are designed for soldering temperatures of about 1150° C. and contain from 5 to 15 mol % of $Al_2O_3$. Such high soldering temperatures are undesirable for modern fuel cells, since they subject the metallic substrate materials and other heat-sensitive materials to an excessive degree.

DE 10 2005 002 435 A1 describes composite solders which consist of an amorphous glass matrix and a crystalline phase. The glass matrix has high contents of CaO and MgO of greater than 20% by weight, but this leads to relatively high viscosities and high dielectric losses. Furthermore, the content of $Al_2O_3$ is at least 10% by weight, $Al_2O_3$ is usually used in a glass solder to control crystallization, but also reduces the thermal expansion of the solder and is therefore often counterproductive when glass solders are used for joining materials having a high thermal expansion.

DE 10122327 A1 describes a glass solder having a coefficient of thermal expansion $\alpha_{(20\text{-}300)}$ of greater than $11 \times 10^{-6}$ K$^{-1}$ composed of the system BaO—CaO—$SiO_2$ for joining ceramics and also metals in the high-temperature range. Particularly when joining materials having a coefficient of expansion α below $12 \times 10^{-6}$ K$^{-1}$, for example $ZrO_2$ ceramics having a coefficient of thermal expansion α of $10 \times 10^{-6}$ K$^{-1}$, thermal stresses occur as a result of the poor match and these stresses can reduce the strength or even lead to complete failure of the joint. The glasses have a BaO content of up to 45-55% by weight. High BaO contents can lead to increased crystallization. Furthermore, the proportion of $SiO_2$ is in a range from 35 to 45% by weight. Increasing $SiO_2$ contents lead to a decrease in the thermal expansion and to an increase in the required joining temperature.

SUMMARY OF THE INVENTION

It is therefore an object of the invention to provide a soldering glass which can be processed at a soldering temperature of not more than about 1100° C. and has a viscosity at operating temperatures to about 900° C. after conclusion of the soldering process which is sufficiently high so that it is not to pressed from the joint and/or does not flow out of the joint and has a linear thermal expansion coefficient $\alpha_{(20-300)}$ in a temperature range of 20° C. to 300° C. of $8 \times 10^{-6}$ K$^{-1}$ to $11 \times 10^{-6}$ K$^{-1}$ and is therefore matched to steels used in fuel cells and also to oxide ceramics, in particular $ZrO_2$ and/or $Al_2O_3$ ceramics.

The object of the invention is achieved by the glass solders according to the independent claims. Preferred embodiments are defined in the dependent claims.

Unless indicated otherwise, all percentages given in the following are by weight on an oxide basis.

According to the invention the glass solders have a linear coefficient of thermal expansion $\alpha_{(20-300)}$ of $8 \times 10^{-6}$ K$^{-1}$ to $11 \times 10^{-6}$ K$^{-1}$. The glass solder of the invention contains from 10% to <45% of BaO, from 10% to 31% of $SiO_2$ and optionally up to 25% of SrO and less than 2% of $Al_2O_3$. However, the proportions of BaO and SrO are selected so that the sum of the amounts of BaO and SrO is from 20% to 65%. It has been found that at higher contents of these two components, the tendency of the glass solder to crystallize during the soldering operation can increase in an undesirable way. If, on the other hand, the sum of the amounts of BaO and SrO is less than 20% the thermal expansion drops to less than $8 \times 10^{-6}$ K$^{-1}$ and is outside the required range. In addition, it has been recognized that a high $Al_2O_3$ content, in particular, of a glass solder can have an adverse effect on its properties; in particular, relatively high contents lead to an increase in the melting and/or soldering temperature and to a decrease in the thermal expansion. The $Al_2O_3$ content is therefore restricted to less than 2% of $Al_2O_3$ according to the present invention.

Furthermore, a glass solder according to the invention optionally contains at least one metal oxide RO selected from the group consisting of MgO, CaO, ZnO and BeO in an amount of up to 30%. The content of these oxides RO can control the crystallization properties of the glass solder. A further positive effect is that the dielectric loss can be reduced by RO-containing glasses. Furthermore, the melting point and the glass transition temperature can be reduced by the network-transforming alkaline earth metal oxides. The content of RO also brings about an increase in the coefficient of thermal expansion and thus represents a simple way of matching the glass solder to the components to be fused.

Furthermore, oxides $R_2O_3$ selected from the group consisting of $B_2O_3$, $Ga_2O_3$, $In_2O_3$, $Y_2O_3$, $La_2O_3$ and $Dy_2O_3$ are optionally present in an amount of up to 30% in the glass solder of the invention. These components $R_2O_3$, too, are able to control the crystallization behavior of the glass solder during the soldering operation. At the same time, they can increase the glass formation temperature. The higher the glass formation temperature $T_g$, the higher the use temperature of the glass solder.

Further optional components are oxides $RO_2$ selected from the group consisting of $TiO_2$, $ZrO_2$ and $HfO_2$ in an amount of up to 20%. These oxides can, in particular, act as nuclei for the partial crystallization which is desired in particular embodiments.

The glass solder of the invention is (except for impurities) preferably free of $TeO_2$ because, inter alia, the raw material is hazardous to human health. This means that the $TeO_2$ content of the glass solder of the invention is preferably less than 0.3% by weight and particularly preferably less than 0.2% by weight.

However, the oxides RO, $R_2O_3$ and $RO_2$ must be present in the glass solder of the invention in a total amount in the range from >2% to 35%.

According to the invention the glass solder has a low content of alkali metals or alkali metal oxides $Li_2O$, $Na_2O$, $K_2O$. According to the invention a total of less than 1% by weight of these stated alkali metal oxides is present in the glass solder. The glass solder of the invention is particularly preferably free, except for impurities, of these stated alkali metal oxides and also of $Rb_2O$ and $Fr_2O$. Alkali metals generally have the reputation of having an adverse effect on the electrical insulation properties. The chemical resistance also decreases with an increasing content of alkali metals. However, the inventors have found that even relatively high contents of $Cs_2O$ do not have an adverse effect on the insulation properties of the glass solder of the invention. For this reason, up to 10% by weight of $Cs_2O$ can be present in the glass solder of the invention. In the glass solder of the invention, $Cs_2O$ preferably even replaces at least a certain proportion of $B_2O_3$ without worsening the chemical resistance of the glass solder in an unacceptable way. This means that, in a preferred embodiment, the sum of the contents of $Cs_2O$ and $B_2O_3$ is not more than 30% by weight. However it is of course also possible for the glass solder to be free of $Cs_2O$ except for impurities.

Further additives are of course possible and are likewise encompassed by the invention. For the purposes of the invention the term "glass solder" encompasses both the amorphous ground glass which is used as soldering glass before the soldering operation and also the material formed from the ground glass during the soldering operation, which material can be present, inter alia, in a vitreous, partially crystallized, glass-ceramic form or another form.

In a preferred embodiment a glass solder according to the invention contains up to 15% of $B_2O_3$. The $B_2O_3$ content has a positive influence not only on the crystallization behavior but also on the melting behavior and thus the glass melt. An excessively high $B_2O_3$ content can, on the other hand, have an adverse effect on the chemical resistance. Furthermore, $B_2O_3$ contents above 15% can lead to vaporization of boron oxide from the glass solder, which is likewise undesirable. Together with the content of $SiO_2$ the content of $B_2O_3$ can to a large extent aid the formation of a stable glass.

A glass solder according to the invention preferably contains up to 5% of CaO. The CaO content can likewise influence the crystallization of the glass solder during the soldering operation, but it is likewise possible to suppress the formation of the undesirable crystal phase, trydimite, by addition of CaO.

A content of up to 6% of MgO is likewise preferred. Greater contents of MgO can lead to increased crystallization during the soldering operation, which can result in an increase in the melting temperatures. This content of MgO increases the interval between sintering and flow to values of >300° C.

A content of up to <10% of $TiO_2$ is likewise preferred. Higher contents of $TiO_2$ can lead to increased crystallization and can in this way shift flow to higher temperatures.

In a further preferred embodiment, a glass solder of the invention contains in each case up to 2% of CrO and/or PbO and/or $V_2O_5$ and/or WO and/or SnO and/or CuO and/or MnO and/or CoO and/or $Sb_2O_3$. These components can, for example, contribute to improving the wetting properties on various substrates. However, the glass solder of the invention is particularly preferably at least largely free of PbO, i.e. PbO is present in an amount of not more than 1% by weight, and the glass solder of the invention is (except for impurities) very particularly preferably free of PbO.

Furthermore impurities due to raw materials or refining agents, for example $As_2O_3$ and/or $BaCl$, can be present in the glass solder of the invention in amounts of up to 0.2% in each case.

After the soldering operation the glass solder of the invention is preferably present as amorphous glass. This means that it has essentially no crystalline regions.

In an alternative preferred embodiment, however, the glass solder of the invention is present as a partially crystalline glass-ceramic in which the proportion of crystalline material is not more than 50% based on the total weight.

In these partially crystalline glasses, excessive crystallization or precipitation of undesirable crystal phases can be avoided by addition of $R_2O_3$ and RO. Excessive crystallization during the joining operation would lead to an increase in viscosity and shift the soldering temperatures to values above 1100° C. $SrBa_2Si_3O_9$ and/or $Ba_{0.8}Sr_{3.2}SiO_3$ and/or $Ba_{0.8}Sr_{0.2}SiO_3$ and/or $BaSi_2O_5$ and/or $BaSiO_3$ and/or $Ba_2SiO_4$ and/or $Ba_4Si_6O_{16}$ and/or $Ba_2Si_3O_8$ and/or $Sr_2MgSi_2O_7$ is/are preferably formed as the crystalline phase. Formation of trydimite can be avoided by addition of CaO.

In the partially crystalline embodiment the composition of the glass solder of the invention is preferably set so that it crystallizes slowly. If it were to crystallize very rapidly, sufficient wetting would often not be obtained. In particular, the soldering glass should, when producing a joint, generally be introduced in uncrystallized or partially crystallized form into the place to be soldered, since the temperature necessary for wetting of the components to be fused is then lower.

It was found that, particularly in this embodiment, there is a eutectic in the ternary system BaO—SrO—$SiO_2$ at which the crystalline phase $SrBa_2Si_3O_9$ precipitates. The weight ratio of the oxides BaO, SrO and $SiO_2$ is selected so that the composition in terms of these three oxides is in the region of the eutectic described. In this way, it is possible to obtain glasses having a narrow temperature interval, less than 300° C., between sintering and flow.

The glass solder according to the invention preferably has a hemisphere temperature of from 820° C. to 1100° C. and can accordingly be used at about this temperature for the joint. Because of this hemisphere temperature range, the glass solder is also suitable for processing in laser bonding processes.

The glass solder of the invention is generally produced by melting the constituents in a conventional glass melter to form a glass and subsequently milling this to form a glass powder. The glass powder can, for example, be introduced into the joint in the form of a dispensable paste or a presintered shaped body.

Optimal strengths of a joint are achieved when the thermal expansion of the solder is optimally matched to the materials to be fused. Furthermore, no excessive stresses may occur in the solder as a result of a change in the coefficient of thermal expansion due to the crystallization process. The glass solder of the invention ensures this by, inter alia, avoiding undesirable crystal phases.

The glass solder of the invention is, because of its physical properties, particularly suitable for producing high-temperature-resistant joints. For the purposes of the invention, "high-temperature-resistant" means a temperature range of greater than about 650° C. Such joints can be used particularly advantageously in fuel cells, in particular SOFCs (solid oxide fuel cells). An example of a use in fuel cells is joining of individual SOFCs to form an SOFC stack. Further fields of application are sensors in combustion apparatuses, for example automobile applications, Schiffs' engines, power stations, aircraft or in space flight. A preferred application is the use of the glass solder of the invention for sensors in the exhaust gas train of motor vehicles having internal combustion engines.

The glass solder of the invention can, however, also be used for producing sintered bodies having a high heat resistance.

Processes for producing sintered bodies are adequately known. In general, the starting materials of the glass solder of the invention are mixed with one another in powder form, mixed with a generally organic binder and pressed into the desired shape. Instead of the powders of the starting materials, it is also possible to mill a previously melted glass according to the invention and mix it with the binder. The pressed glass-binder body is then brought to sintering temperature, with the binder being able to burn out and the glass components being able to sinter together at the sintering temperature. The resulting sintered body can then be brought into contact with the components to be joined and join these and/or be joined to these by a soldering operation.

The use of sintered bodies in soldering has the advantage that the sintered body is a shaped component and can be produced in virtually any geometry. A shape which is, for example, frequently used is a hollow cylinder which can be introduced together with an electric contact pin into lead-through openings in metal components in order to obtain a preferably hermetically sealed glass-metal lead-through having an electrically insulated contact pin after soldering. Such glass-metal lead-throughs are used in many electric components and are known to those skilled in the art.

A further preferred application of the crystallizing glass solder and/or composite of the invention is the production of sheets which comprise the glass solder and/or the composite. Such sheets are similar to the above-described sintered bodies but can also be made largely flexible. Shapes can be stamped out of these and can advantageously be used for joining flat components to one another.

EXAMPLES

The invention is illustrated further herein below by examples of the composition and properties of glass solders according to the invention and also with the aid of comparative examples.

First the glass solder was melted in a glass melter. The following properties of the glass solder were measured and the glass solder was generally present in the form of a block, at least in a large-format piece. Definitions:

$\alpha_{(20-300)}$ linear coefficient of thermal expansion in a range of 20° C. to 300° C., $T_g$ glass transition temperature or transition temperature (abbreviated), ST softening temperature; at this temperature the logarithm of the viscosity is 7.6

The compositions of the glass solder and the physical properties thereof are summarized in the following Table I.

After characterization of the glass solder a glass solder powder was produced from the glass solder by a milling process. In the present examples glass solder powder having a particle size distribution having a D(50) of about 10 μm and a D(99)<63 μm was provided from the fused glass solder and processed together with a binder to give a dispensable paste. Powder and binder were homogenized by a three-roll mill. The binder is generally an organic substance such as nitrocellulose, ethylcellulose or acrylate binder. It generally has no further influence on the properties of the crystallized glass solder, but should be selected so that it can be burned out completely during heating.

TABLE I

EXEMPLARY GLASS SOLDERS OF THE INVENTION AND THEIR PHYSICAL PROPERTIES

| Examples | 1 | 2 | 3 | 4 | 5 | 6 |
|---|---|---|---|---|---|---|
| BaO | 44 | 43.1 | 44.6 | 42.6 | 42 | 38.8 |
| $SiO_2$ | 26 | 25.3 | 26.2 | 25 | 24.7 | 22.8 |
| SrO | 15 | 14.6 | 15.2 | 14.4 | 14.3 | 13.1 |
| $B_2O_3$ | 10 | 10 | 10 | 10 | 10 | 9 |
| CaO | 2 | 2 | 2 | 2 | 2 | 1.8 |
| MgO | 2 | 5 | 2 | 5 | 7 | 4.5 |
| $Al_2O_3$ | 1 | 0 | 0 | 1 | 0 | 0 |
| TiO2 | 0 | 0 | 0 | 0 | 0 | 10 |
| Physical Property Measurement Results | | | | | | |
| $\alpha_{(20-300)}\ 10^{-6}/K$ | 10.13 | 10.25 | 10.26 | 10.19 | 10.32 | 9.76 |
| Tg [° C.] | 602 | 598 | 610 | 599 | 592 | 629 |
| Dilatometric softening point [° C.] | 652 | 642 | 648 | 640 | 635 | 671 |
| Density g/cm³ [° C.] | 3.8627 | 3.8415 | — | — | — | 3.8769 |
| Commencement of sintering [° C.] | 652 | 642 | 640 | 647 | 649 | 673 |
| Softening point [° C.] | 741 | 742 | 711 | 710 | 688 | 756 |
| Spherical temperature [° C.] | 780 | 772 | 785 | 776 | 768 | 975 |
| Hemisphere temperature T(log η = 4.55) [° C.] | 852 | 828 | 921 | 842 | 826 | 1005 |
| Flow temperature [° C.] | 918 | 876 | 938 | 922 | 1013 | 1032 |
| Temperature at which the toughness is $10^{13}$ dPas [° C.] | 615 | 602 | — | — | — | — |
| Temperature at which the toughness is $10^{7.6}$ dPas [° C.] | 719 | 709 | — | — | — | — |
| Temperature at which the toughness is $10^4$ dPas [° C.] | 855 | 847 | — | — | — | — |
| Electrical conductivity tk100 [° C.] | 507 | 499 | — | — | — | — |
| Modulus of elasticity [$10^3$ n/mm²] | 79.5 | 79.88 | — | — | — | — |
| Torsion modulus [$10^3$ n/mm²] | 30.81 | 30.88 | — | — | — | — |
| Poisson's ratio | 0.291 | 0.294 | — | — | — | — |
| Damping [$10^{-3}$] | 1.62 | 1.75 | — | — | — | — |
| Crystallization temperature | 796° C. | | | | | |

The thermal characterization of the glass solders is subsequently carried out by a hot stage microscope. For this purpose a cylindrical test sample is pressed from the soldering glass or composite in powder form to be characterized, and this test specimen is heated on a ceramic stage at 10 K/min. The changes in shape of the test sample are observed, with the following characteristic points, to which particular viscosities can be assigned, generally occurring in the case of a noncrystallizing sample with rising temperature:

Commencement of sintering: at this temperature, the grains of the powder begin to fuse. The height of the test specimen decreases as a result. The logarithm of the viscosity is about 10±0.3.

Softening temperature: this temperature $ST_K$ is characterized by commencement of rounding of the edges of the test cylinder. The logarithm of the viscosity is about 8.2.

Spherical temperature: the logarithm of the viscosity is about 6.1.

Hemisphere temperature: the test specimen has approximately the shape of a hemisphere at this temperature. The logarithm of the viscosity is about 4.6±0.1.

Flow temperature: at this temperature, the height of the test specimen is about ⅓ of the initial height. The logarithm of the viscosity is about 4.1±0.1.

Crystallization temperature $T_c$: peak crystallization temperature determined by differential thermal analysis (DTA), exothermic reaction.

The thermal properties of the glass solders determined by hot stage microscope and also the properties after crystallization are likewise summarized in Table 1.

On the other hand, all examples E1 to E6 have the behavior desired according to the invention. These achieve hemisphere temperatures significantly below 1100° C. The hemisphere temperature is often also referred to as the sealing temperature. This makes the glass solders of the invention particularly suitable for laser bonding processes, since at relatively high process temperatures the ceramics to be joined and/or sealed by the glass solder become excited by the laser owing to the change in optical properties (increase in the absorption coefficient) and an undesirable increase in temperature can thus occur.

When laser radiation is used for joining, the region to be joined is generally heated very rapidly, with crystallization being largely suppressed. A stable bond can be obtained within a period ranging from a few seconds to minutes. Positive joining experiments were carried out using a diode laser (power: 3 kW) and emission wavelengths of 808 nm and 940 nm. The starting glasses were stirred as powders with liquid to form a suspension and painted onto the parts to be joined and subsequently irradiated with the laser.

The glass solders of the invention combine all positive properties according to the object of the invention with one another. The soldering glass as intermediate can be produced by a conventional melting process with good melting properties and melting temperatures which are not too high. It has a thermal expansion in the desired range and also, in particular, a tendency to crystallize which can be controlled as required. The composition effectively prevents the formation of undesirable crystal phases, which makes low-stress joints which are stable in the long term possible. Because of their freedom from alkali metals, the glass solders of the invention have excellent electrical insulation properties, even at high temperatures.

The glass solders of the invention enable joints which allow high operating temperatures of greater than 900° C. to be obtained at low processing temperatures of from about 820°

C. to a maximum of 1100° C. Furthermore, the good wetting of the interconnector materials due to the absent or slow partial crystallization only after introduction of the solder makes joints which are stable in the long term possible. A glass solder according to the invention can be used for producing a gastight high-temperature-stable, electrically insulating joint between materials having a thermal expansion of $8 \times 10^{-6}$ $K^{-1}$ to $11 \times 10^{-6}$ $K^{-1}$. Such materials are, for example, high-expansion steels, high-chromium alloys and also oxide ceramics, in particular $ZrO_2$.

In particular, joints between $ZrO_2$ and $ZrO_2$ and also between $ZrO_2$ and other materials having a high thermal expansion, high-expansion alloys such as CFY, Durcolloy, Inconel or Crofer22APU can be achieved.

While the invention has been illustrated and described as embodied in high-temperature glass solder and its uses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A high-temperature joint for a fuel cell, an exhaust gas sensor, or a spark plug, wherein said high-temperature joint comprises a glass solder, said glass solder having a coefficient of thermal expansion $\alpha_{(20\text{-}300)}$ of $8 \times 10^{-6}$ $K^{-1}$ to $11 \times 10^{-6}$ $K^{-1}$ and comprising, in % by weight on an oxide basis:

| | |
|---|---|
| BaO | 10-<45 |
| SrO | 13.1-25 |
| Σ BaO + SrO | 23.1-65 |
| $SiO_2$ | 10-31 |
| $Al_2O_3$ | <2 |
| $Cs_2O$ | 0-10 |
| Σ RO | 0-30 |
| Σ $R_2O_2$ | 0-30 |
| Σ $RO_2$ | 0-20 |
| Σ RO + $R_2O_2$ + $RO_2$ | >2-35 |
| Σ $Li_2O$ + $Na_2O$ + $K_2O$ | <1, | wherein RO is at least one metal oxide selected from the group consisting of MgO, CaO, ZnO and BeO; $R_2O_3$ is at least one oxide selected from the group consisting of $B_2O_3$, $Ga_2O_3$ $In_2O_3$, $Y_2O_3$, $La_2O_3$ and $Dy_2O_3$; and $RO_2$ is at least one oxide selected from the group consisting of $TiO_2$, $ZrO_2$ and $HfO_2$.

2. A sintered body or sheet having heat resistance, said sintered body or sheet comprising a glass solder, wherein said glass solder has a coefficient of thermal expansion $\alpha_{(20\text{-}300)}$ of $8 \times 10^{-6}$ $K^{-1}$ to $11 \times 10^{-6}$ $K^{-1}$ and comprises, in % by weight on an oxide basis:

| | |
|---|---|
| BaO | 10-<45 |
| SrO | 13.1-25 |
| Σ BaO + SrO | 23.1-65 |
| $SiO_2$ | 10-31 |
| $Al_2O_3$ | <2 |
| $Cs_2O$ | 0-10 |
| Σ RO | 0-30 |
| Σ $R_2O_2$ | 0-30 |
| Σ $RO_2$ | 0-20 |
| Σ RO + $R_2O_2$ + $RO_2$ | >2-35 |
| Σ $Li_2O$ + $Na_2O$ + $K_2O$ | <1, | wherein RO is at least one metal oxide selected from the group consisting of MgO, CaO, ZnO and BeO; $R_2O_3$ is at least one oxide selected from the group consisting of $B_2O_3$, $Ga_2O_3$, $In_2O_3$, $Y_2O_3$, $La_2O_3$ and $Dy_2O_3$; and $RO_2$ is at least one oxide selected from the group consisting of $TiO_2$, $ZrO_2$ and $HfO_2$.

3. A method of joining high-expansion steel, chromium alloy, $Al_2O_3$ ceramic and/or $ZrO_2$ ceramic components, said method comprising joining said components with a glass solder, wherein said glass solder having a coefficient of thermal expansion $\alpha_{(20\text{-}300)}$ of $8 \times 10^{-6}$ $K^{-1}$ to $11 \times 10^{-6}$ $K^{-1}$ and comprising, in % by weight on an oxide basis:

| | |
|---|---|
| BaO | 10-<45 |
| SrO | 13.1-25 |
| Σ BaO + SrO | 23.1-65 |
| $SiO_2$ | 10-31 |
| $Al_2O_3$ | <2 |
| $Cs_2O$ | 0-10 |
| Σ RO | 0-30 |
| Σ $R_2O_2$ | 0-30 |
| Σ $RO_2$ | 0-20 |
| Σ RO + $R_2O_2$ + $RO_2$ | >2-35 |
| Σ $Li_2O$ + $Na_2O$ + $K_2O$ | <1, | wherein RO is at least one metal oxide selected from the group consisting of MgO, CaO, ZnO and BeO; $R_2O_3$ is at least one oxide selected from the group consisting of $B_2O_3$, $Ga_2O_3$, $In_2O_3$, $Y_2O_3$, $La_2O_3$ and $Dy_2O_3$; and $RO_2$ is at least one oxide selected from the group consisting of $TiO_2$, $ZrO_2$ and $HfO_2$.

4. A high-temperature joint between high-expansion steel, chromium alloy, $Al_2O_3$ ceramic and/or $ZrO_2$ ceramic components, comprising a glass solder, said glass solder having a coefficient of thermal expansion $\alpha_{(20\text{-}300)}$ of $8 \times 10^{-6}$ $K^{-1}$ to $11 \times 10^{-6}$ $K^{-1}$ and comprising, in % by weight on an oxide basis:

| | |
|---|---|
| BaO | 10-<45 |
| SrO | 13.1-25 |
| Σ BaO + SrO | 23.1-65 |
| $SiO_2$ | 10-31 |
| $Al_2O_3$ | <2 |
| $Cs_2O$ | 0-10 |
| Σ RO | 0-30 |
| Σ $R_2O_2$ | 0-30 |
| Σ $RO_2$ | 0-20 |
| Σ RO + $R_2O_2$ + $RO_2$ | >2-35 |
| Σ $Li_2O$ + $Na_2O$ + $K_2O$ | <1, | wherein RO is at least one metal oxide selected from the group consisting of MgO, CaO, ZnO and BeO; $R_2O_3$ is at least one oxide selected from the group consisting of $B_2O_3$, $Ga_2O_3$, $In_2O_3$, $Y_2O_3$, $La_2O_3$ and $Dy_2O_3$; and $RO_2$ is at least one oxide selected from the group consisting of $TiO_2$, $ZrO_2$ and $HfO_2$.

5. The high-temperature joint according to claim 4, wherein the glass solder is present as a partially crystalline glass ceramic containing not more than 50% by weight crystalline material after a soldering operation.

6. The high-temperature joint according to claim 5, wherein the crystalline material contains at least one member selected from the group consisting of $SrBa_2Si_3O_9$, $Ba_{0.8}Sr_{3.2}SiO_3$, $Ba_{0.8}Sr_{0.2}SiO_3$, $BaSi_2O_5$, $BaSiO_3$, $Ba_2SiO_4$, $Ba_4Si_6O_{16}$, $Ba_2Si_3O_8$ and $Sr_2MgSi_2O_7$.

7. The high-temperature joint according to claim 5, wherein the crystalline material contains no trydimite.

8. The high-temperature joint according to claim 5, wherein the glass solder has a hemisphere temperature of from 820° C. to 1100° C.

9. The high-temperature joint according to claim 4, wherein the glass solder further comprises, in % by weight on an oxide basis:

| | |
|---|---|
| $B_2O_3$ | 0-15 |
| CaO | 0-5 |
| MgO | 0-6 |
| $TiO_2$ | ≤10. |

* * * * *